April 28, 1942.　　　A. BOYNTON　　　2,280,786

THREADLESS DRILL PIPE

Filed July 17, 1939　　　2 Sheets-Sheet 1

Alexander Boynton, Inventor,

By Jesse R. Stone & Lester B. Clark

Attorneys.

April 28, 1942. A. BOYNTON 2,280,786
THREADLESS DRILL PIPE
Filed July 17, 1939 2 Sheets-Sheet 2
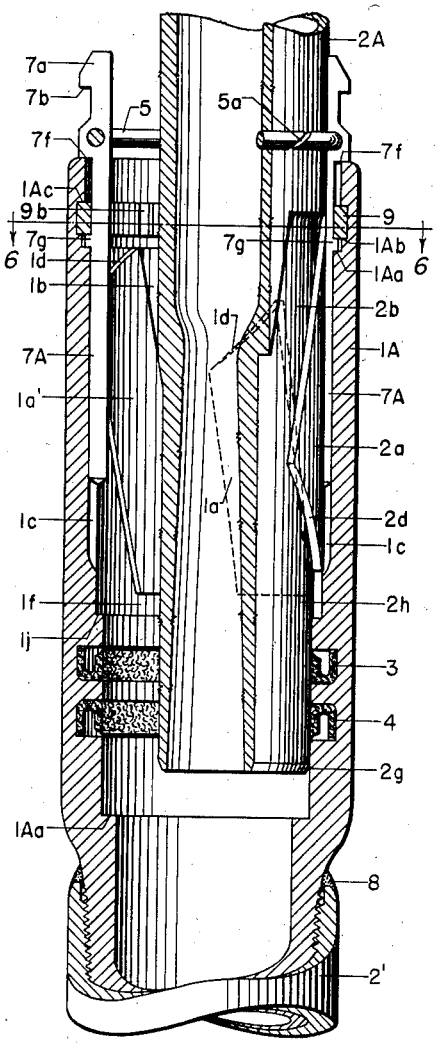
Fig. 5.
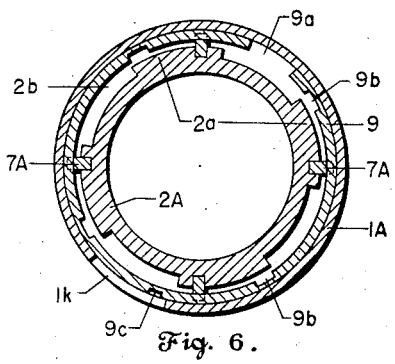
Fig. 6.
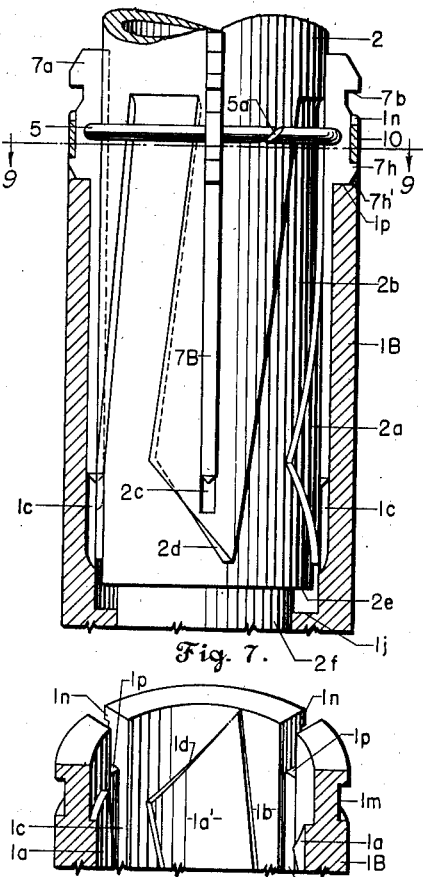
Fig. 7.
Fig. 8.
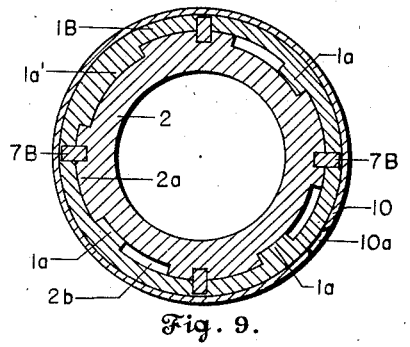
Fig. 9.
Alexander Boynton, Inventor,
Jesse R. Stone
Lester O. Clark
By
Attorneys.

Patented Apr. 28, 1942

2,280,786

UNITED STATES PATENT OFFICE 2,280,786

THREADLESS DRILL PIPE

Alexander Boynton, San Antonio, Tex.

Application July 17, 1939, Serial No. 284,894

8 Claims. (Cl. 285—146)

My invention relates to threadless means for connecting joints of pipe together, particularly drill stem and the like, as well as shafts.

The principal object is to provide means for securely and quickly joining or disconnecting joints of pipe or shafts without the employment of threads.

Another object is to provide means for such connections which will not permit the joints of pipe or shafts to become accidently disconnected by rotary thrust in either direction.

A further object is to provide a connection means which may be connected and disconnected more quickly than can be accomplished by the employment of threads.

A still further object is to provide a connection means of greater strength than threads afford.

Another object is to minimize localized stresses, thereby preventing a rapid rate of crystallization and resulting breakage.

I attain the foregoing objects by means of inclined ribs and slots on the male and female members, the ribs of one member mating with the slots of the other, and vice versa; such engagement being secured by straight keys engaging within straight registering slots, one-half of each slot being in each member, and further secured by a lock ring preventing accidental disengagement of the keys and slots. In connection with the above parts, a leak-proof connection is provided by the employment of suitable packing; all of which will clearly appear from the following drawings in which—

Fig. 5 is a vertical section through the first modified form.

Fig. 6 is a cross section on the line 6—6, Fig. 5.

Fig. 7 is a vertical section through a second modified form.

Fig. 8 is a longitudinal isometric section of the upper end of the coupling shell in Fig. 7.

Fig. 9 is a cross section on the line 9—9, Fig. 7.

Similar characters of reference are employed to designate similar parts throughout the several views.

Figure 3:
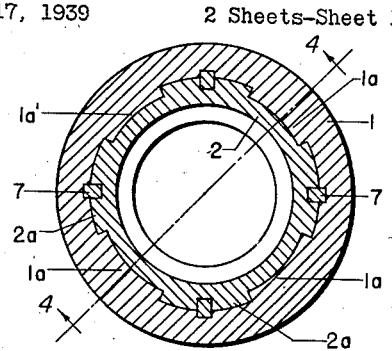
Fig. 3 is a cross section on the line 3—3, Fig. 1.

The coupling shell 1 has outstanding spiral lands 1a adapted to be received within spiral grooves 2b of the male member 2, which has outstanding lands 2a adapted to be received within spiral grooves 1b of the coupling member. The spiral lands and grooves on both male and female members are of the same pitch, the lands of each member being adapted to slidably engage within the grooves of the other member. At the lower ends of lands 1a and 1a' is an annular undercut groove 1f. This groove is merely for manufacturing convenience.

The grooves 2b of the member 2 are somewhat longer than the grooves 1b of the shell, in order that the engagement between the members 1 and 2 may proceed far enough to allow the annular shoulder 2e of the male member 2 to land upon the annular shoulder 1j of the shell 1.

All of the lands 2a of the male member 2 may be of equal length, but one of the lands 1a' of the shell is preferably longer than the other lands 1a of the same member.

Below the shoulder 1j are two interior annular grooves 1g and 1h in the shell 1. U cups or other packing members 3 and 4 are fitted within the annular grooves 1g and 1h, respectively, in order to produce a fluid-tight joint between the member 1 and the lower tubular extension 2f of the male member. One of the cups faces upward to prevent well fluid from entering the drill stem, and the other cup faces downward to prevent pump fluid from escaping from the drill stem. The bevel 2g is provided on the lower end of the male member to avoid damaging the U cups or packing 3 and 4 while the connection is being formed.

Figure 1:
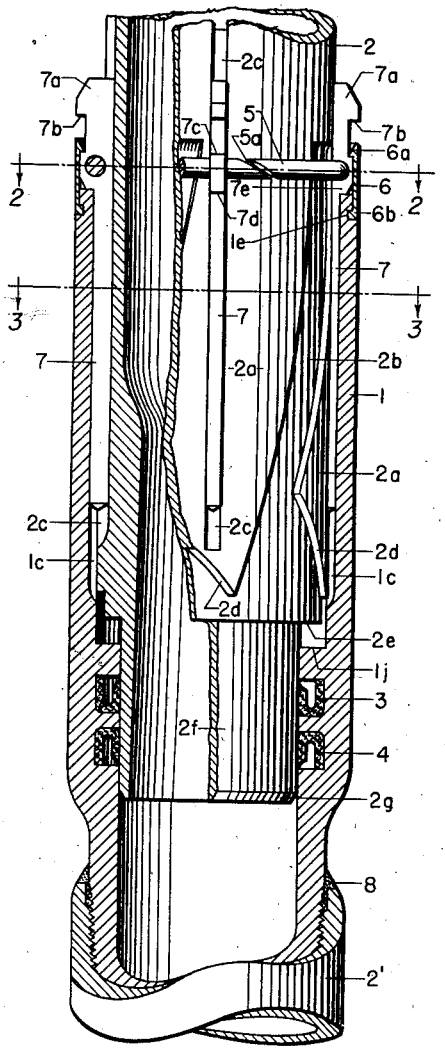
Fig. 1 is a longitudinal section through the preferred embodiment.
Figure 4:
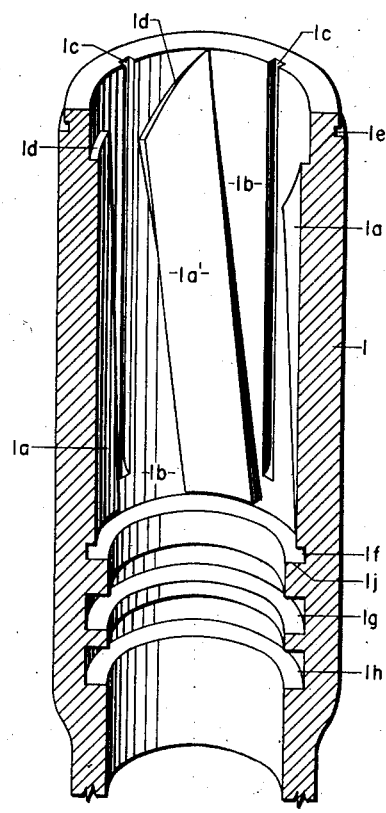
Fig. 4 is a vertical section through the coupling shell on the line 4—4, Fig. 3.
Figure 2:
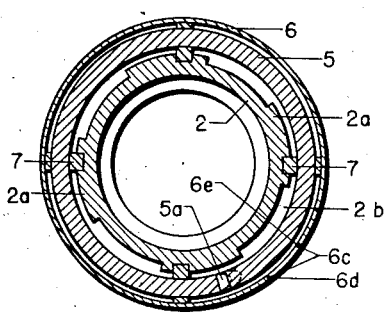
Fig. 2 is a cross section on the line 2—2, Fig. 1.

As a locking means securing together the members 1 and 2, I employ a plurality of straight keys 7 which are adapted to be slidably engaged within the straight grooves or keyways 1c of the shell and 2c of the male member, each of said keys being received for approximately one-half of its diameter in said ways, as appears in Figs. 2 and 3. When the keys are in place, the shoulders 7d land upon the upper end of the shell 1, as appears in Fig. 1.

The keyways 1c of the shell are cut somewhat longer than the keys for clearance only, but the grooves 2c of the male member are cut somewhat more than twice the length of the keys for convenience in assembling and taking apart.

It will be observed that the keyways 1c are cut in the grooves 1b of the female member, and that the keyways 2c are cut in the lands 2a of the male member.

The key ring 5, cut through as at 5a, is slidably received within a conforming circular opening in each key. This ring is normally of slightly smaller diameter than the drill pipe, it being shown somewhat expanded in Fig. 1, in order that it will exert a clamping force upon the keys; thus urging them to remain closely engaged upon the inner surface of the slots 2c.

The upper end of each key 7 is flat in order to receive the pushing force of a special tool for forcing the keys downward, as will be explained. The nether shoulder 7b is to receive the upward thrust of a special tool for forcing the keys out of the ways 1c of the coupling shell.

To retain the keys against accidental removal I use a channel-shaped snap ring 6 which is cut through, as shown at 6c, Fig. 2, and has its upper and lower ends flanged as appears at 6a and 6b, Fig. 1.

When the device is assembled as in Fig. 1, the upper flange 6a is freely received over the slight external shoulder 7e of each of the keys while the lower flange 6b is engaged within a circular recess 1e of the shell 1.

In operation, to take apart the device assembled as in Fig. 1, proceed as follows (1) Spread the snap ring 6 and fit the same about the shell 1 proximately below the groove 1e; (2) apply a slight lifting force to the keys by a special tool engaged under the shoulders 7b; (3) lift up the joint 2. As soon as the lift upon the joint 2 equals its weight, the lateral thrust imparted to the straight keys 7 by the engaged spiral slots and lands will be relieved and the straight keys will slide upward in the slots 2c and out of engagement with the slots 1c of the shell. The same lifting force applied to the male member 2, which frees the keys, as just stated, may be continued to lift the joint out of the shell, both operations being simultaneous in practice; thus completing the separation of members 1 and 2.

In standing back the drill pipe on the derrick floor, the keys 7, remaining where put when forced upward, will be held securely within the slots 2c by the compression force of the spring ring 6.

Now, to re-assemble, proceed as follows: (1) Lift the pipe 2 and set it down within the shell 1 until the shoulder 2e engages upon the shoulder 1j. In this operation, the pilot land 1a', being longer than the other lands 1a, will have its upper sloping surface 1d engaged by either one of the lower sloping surfaces 2d of the lands 2a. The pilot land 1a', thus serves to make sure that the lands of the keys on the members 1 and 2 will not become stationarily impinged upon each other during the assembling operation; (2) Press the keys 7 downward by a special ring-shaped tool or weight engaged upon the heads 7a; (3) Lift the pipe 2 slightly until the keys 7 are brought into registration with the slots 1c. The keys will then go freely to place by force of the weight still engaged upon them; (4) Push up the snap ring 6 (it being deposited about the shell 1 proximately below the groove 1e, as stated for disconnecting) until it snaps into the position shown in Fig. 1. This completes the assembly.

It will be understood that the rotary movement resulting from engaging the grooves and lands of the members 1 and 2 will produce registration of the keyways 1c and 2c when the parts are in the position shown in Fig. 1.

The slots 1c and 2c are made to register when the shoulder 2e is slightly above (such as ¼ to ½ inch), the shoulder 1j in order to avoid extreme precision in construction, such as would result from these slots being in registration only when the shoulders 2e and 1j are in contact. Furthermore, if such registration were provided when said shoulders are in contact, a slight impaction of mud between those shoulders would hinder the assembly, which can be quickly and easily made or disconnected by providing that the slots 1c and 2c are in registration when the members 1 and 2 are in the relation shown in Fig. 1.

It is apparent that, while the device is assembled, the lands 1a and 1a' or the lands 2a, as well as the keys 7, would have to be sheared before independent rotation in either direction could be accomplished between the members 1 and 2. It is also apparent that no pulling apart strain could separate the members 1 and 2 without first shearing the keys 7 for their full length, because of the rotary movement necessary to withdraw the lands of each member from the grooves of the other.

Neither can the pipe 2 telescope further into the shell 1 which movement would place the shoulders 2e and 1j in contact, because such movement would involve slight independent rotation of the parts 1 and 2; such rotation being resisted by the keys 7, as stated.

The snap ring 6 will prevent the keys 7 from working out of their engagement within the slots 1c and 2c during rotation of the drill pipe in the well, although there is slight danger of the keys becoming so disengaged, because a pulling apart strain and a compression strain both tend to impinge the members 1 and 2 upon the keys 7.

It will be observed that the snap ring 6 has its open ends formed into two sloping surfaces. The outer slope 6d extends well past the center of the ring in order that the force of the mud contacted during rotation of the drill pipe will tend to keep the ring closed. The other shorter slope 6e is to facilitate a special removing tool in forming proper contact with the ring.

The lower joint of drill pipe 2' may be threadedly connected into the member 1 and secured upon it by the weld 8; or the member 1 may be fabricated in an externally upset joint of drill pipe. Likewise, the upper joint of drill pipe 2 may be screwed into a drill pipe coupling and welded, as shown at 8, to form a similar connection to the one shown proximate the lower end of Fig. 1; or the slots and lands upon the member 2 may be formed directly upon the drill pipe.

In Fig. 5, illustrating the first modified form of this invention, the shoulders 2e and 1j of Fig. 1 are eliminated and the male member 2A has its lower tubular extension 2h landed upon the annular shoulder 1Aa in the act of assembling, corresponding in purpose to the similar shoulder 1j in Fig. 1. Otherwise, the member 2A is the same in construction and purpose as the member 2 in Fig. 1.

The coupling shell 1A has a transverse slot 1k, Fig. 6, for convenience in manipulating the securing slide ring 9 which, in this construction, replaces the snap ring 6 in Fig. 1.

The keys 7A are formed with a shoulder 7f adapted to engage upon the upper end of the shell 1A when the connection is completely formed at which time the lower external enlargement 7g of the keys will land upon or have slight clearance with the internal annular shoulder 1Aa'. The enlargement 7g of each key immediately above this shoulder is adapted to have slight clearance within the upper portion of the member 1A above and below the ring 9.

The securing ring 9 has an opening 9a (Fig. 6) enabling it to be sufficiently compressed to permit its being placed within and conforming with the annular groove having its lower end defined by the annular shoulder 1Ab and its upper end at the annular shoulder 1Ac. This ring has internal peripheral slots 9b adapted to permit the enlargement 7g of the keys to pass through them with slight clearance when these slots of the ring are in registration with the keys.

The slide ring 9 has an external lateral opening 9c adapted to be engaged by a special tool applied through the slot 1k by means of which the ring 9 may be caused to slide rotatably in one direction to cause its slots 9b to register with the keys, and may be caused to slide in the opposite direction to place its unslotted portion above the keys. It is apparent that the transverse slots 9b of the ring 9 must be in registration with the keys 7A while the assembly is being formed or disconnected. As a securing means against possibility of the keys working out during rotation of the drill pipe, the ring 9 is rotated so that the slots 9b will be out of registration with the keys when the assembly is formed. This ring, being normally of slightly greater diameter than the slot into which it is fitted, is adapted to have a friction grip upon the inner surface of that slot, thereby disposing the ring to remain put where placed.

The mechanism shown in Fig. 5 is operable in the same manner as stated in connection with Figure 1.

It will be understood for this and the succeeding form of the invention, that parts bearing the same reference characters as in a previous embodiment are the same in purpose as well as in construction throughout the several embodiments.

Figs. 7, 8 and 9, illustrating the second modified form, are a modification of the construction shown in Fig. 1.

The only difference between this and the preferred embodiment is in the snap ring 10, the keys 7b, and the upper portion of the case 1B. The changes in the keys and case result from adapting them to form of snap ring employed and designated at 10 in Figs. 7 and 9. This snap ring, like the member 6 in Fig. 1, and the member 9 in Fig. 5, is for the purpose of preventing the keys 7B from becoming dislodged from their assembled position in Fig. 7 by vibration of the drill stem in service.

Each of the keys 7B has an enlargement 7h adapted to engage upon the shoulder 1p at the bottom of each of the slots 1n, Fig. 8. The key enlargement 7h has a sloping outside surface 7h'.

The snap ring 10 is divided transversely at 10a, Fig. 9, the ends of the ring being formed into inner and outer slopes corresponding in purpose to the slopes 6c and 6d in Fig. 2. This ring, in place, conforms closely with the external annular recess 1m, Fig. 8.

The device being assembled as in Fig. 7, to take it apart, remove the snap ring 10 and deposit it about the member 1B proximately below the recess 1m; apply a slight lifting force under the shoulders 7b and lift out the member 2. The snap ring may then be urged upward until it snaps into the recess 1m in readiness for the reassembling operation. In again assembling the parts 1 and 2, the sloping surfaces 7h' of the keys will automatically expand the snap ring, which will close into the position shown in Fig. 7 when the keys go home to their assembled position as shown in that figure.

It is obvious that many mechanical changes, substitutions, and adaptations may be made in the construction, and that equivalents may be substituted for the parts shown; and I reserve the right to make such mechanical changes, substitutions, and adaptations within the scope of the invention as comprehended by the stated objects and appended claims.

I claim:

1. A coupling for drill pipe sections including interengaging male and female members on said sections, spiral lands and grooves on said members formed to interfit by a screwing action where said members are engaged, keyways in the meeting surfaces of said members formed longitudinally thereof parallel with the axis of said coupling, keys to engage in said keyways, and a snap ring formed to engage said female member and said keys and resist removal of said keys.

2. A coupling for drill pipe sections including interengaging male and female members on said sections, interfitting lands on the contacting surfaces of said members arranged in lines out of parallelism with the longitudinal axis of said coupling, keyways in each of said lands on said male member and between the lands on said female member formed longitudinally thereof parallel with the axis of said coupling, keys to engage in said keyways, and a snap ring formed to engage said female member and said keys and resist removal of said keys.

3. A coupling for drill pipe sections including interengaging male and female member on said sections, interfitting lands on the contacting surfaces of said members arranged in lines out of parallelism with the longitudinal axis of said coupling, keyways in said lands on said male member, opposed keyways between the lands of said female member, said keyways being formed longitudinally thereof, keys to engage in said keyways, and means for removably securing said keys in said slots.

4. A coupling for drill pipe sections including interengaging male and female members on said sections, spiral lands and grooves on said members formed to interfit by a screwing action where said members are engaged, keyways in the meeting surfaces of said members formed longitudinally thereof and keys to engage in said keyways.

5. A coupling for drill pipe sections including interengaging male and female members on said sections, spiral lands and grooves on said members formed to interfit by a screwing action where said members are engaged, keyways in the meeting surfaces of said members formed longitudinally thereof, keys to engage in said keyways, and means for removably securing said keys in interfitting relation with said male and female members.

6. A coupling for drill pipe sections including an interengaging male and female member on said sections, interfitting lands on the contacting surfaces of said members arranged in lines out of parallelism with the longitudinal axis of said couplings, keyways in each of said members on the meeting surfaces thereof, and longitudinal therewith, keys to engage in said keyways, and means for causing the interfitting male and female members to be hermetic in their engagement.

7. A coupling for drill pipe sections including interengaging male and female members on said sections, spiral lands and grooves on said members formed to interfit by a screwing action where said members are engaged, keyways in the meeting surfaces of said members formed longitudinally thereof, keys to engage removably in said keyways, and U-cups fitted into said female member and adapted to be expanded by fluid pressure into hermetic engagement between said members.

8. The combination of a male and a female member having interfitting spiral lands and slots, one of said lands being longer than the others in order to pilot said members into a predetermined position of assembly, keyways in said members in opposed relation when the members are in interfitting relation, keys removably secured in said keyways, and U-cup means for producing hermetic engagement between said members.

ALEXANDER BOYNTON.